US005744519A

United States Patent [19]
Heraud et al.

[11] Patent Number: 5,744,519
[45] Date of Patent: Apr. 28, 1998

[54] INK COMPOSITION FOR MARKING NONPOUROUS SUPPORTS

[75] Inventors: Alain Heraud; Pierre De Saint-Romain, both of Valence, France

[73] Assignee: Imaje S.A., Bourg-Les-Valence, France

[21] Appl. No.: 603,899

[22] Filed: Feb. 22, 1996

[30] Foreign Application Priority Data

Mar. 8, 1995 [FR] France .................. 95 02701

[51] Int. Cl.$^6$ .................. C09D 11/10; C08K 3/04
[52] U.S. Cl. .................. 523/160; 523/161; 524/495; 106/20 D; 106/22 R; 106/23 R; 106/31.13; 106/31.86; 252/502
[58] Field of Search .................. 523/160; 106/22 R, 106/23 R, 20 D, 31.13, 31.86; 524/495

[56] References Cited

U.S. PATENT DOCUMENTS

| | | | |
|---|---|---|---|
| 4,024,096 | 5/1977 | Wachtel | 260/29.3 |
| 4,472,537 | 9/1984 | Johnson et al. | 523/160 |
| 4,604,139 | 8/1986 | Shioi et al. | 106/22 R |
| 5,376,169 | 12/1994 | Hotomi et al. | 106/23 |
| 5,538,821 | 7/1996 | Kakinuma et al. | 430/18 |

FOREIGN PATENT DOCUMENTS

| | | |
|---|---|---|
| 1186143 | 4/1985 | Canada. |
| 0 403 272 | 12/1990 | European Pat. Off.. |
| 1131867 | 10/1968 | United Kingdom. |
| 1595453 | 8/1981 | United Kingdom. |

*Primary Examiner*—Tae Yoon
*Attorney, Agent, or Firm*—Pearne, Gordon, McCoy & Granger LLP

[57] ABSTRACT

The invention relates to an ink composition for the marking of objects, specifically nonporous in particular glass bottles having to pass into a bottling chain or line. This ink comprises at least one dye, an organic solvent and a binder incorporating the combination of at least one polymeric resin having hydroxyl or carboxyl functions and a hydrophobic polymeric resin of the epoxy type having a plasticizing effect.

The invention also relates to a process for marking objects, using in particular the deflected continuous jet procedure employing said ink, as well as the thus marked substrates.

18 Claims, No Drawings

INK COMPOSITION FOR MARKING NONPOUROUS SUPPORTS

The invention relates to an ink composition for marking nonporous supports, particularly glass, plastics, metals or any other nonporous surface, which is particularly appropriate to the marking by an ink jet and which is more particularly suitable for glass bottle continuous jet marking procedures, particularly glass bottles having to pass into a bottling chain or line.

Printing by an ink jet is well known and permits the printing, marking or decoration of all types of objects and at a high speed, there being no contact between said objects and the printing device, randomly variable messages such as bar codes, selling limit dates, etc. being printable on non-planar supports.

Ink jet printing systems can be subdivided into two major groups, namely drop on demand (DOD) and continuous jet (CJ). The ingredients forming the inks for said printing systems are organic products, dyes or pigments, resins, in solvents which are volatile to a greater or lesser extent or in water and other additives can be incorporated such as those necessary for giving the ink the conductivity needed for electrostatic deflection in the continuous jet procedure.

The ink compositions can be implied by the drop on demand procedures, namely on the one hand using piezoelectric systems with the deformation of a piezoelectric ceramic under the effect of a voltage in order to suck and project the ink and on the other bubble jet systems, are usually water-based. Thus, the use of water makes it possible to use the most widespread, water-soluble dyes. Other reasons for using water as the solvent medium for such inks are its price, its absence of toxicity and its low volatility. The inherent weakness of all water-based inks is the sensitivity to water of the markings obtained. Endeavours have therefore been made to improve the resistance to water of inks used in the drop on demand method by developing specific dyes and particular combinations.

Thus, FR-A-2 305 479 describes an ink for a water-based ink jet printer in which the dye is dissolved in a solvent immiscible in water with the addition of a complexing agent incorporating a long chain fatty acid salt and a wetting agent (sodium aryl sulphonate) by means of which a single phase is obtained. The dried ink is insensitive to water in the wet friction test.

Due to the fact that the inks used in systems of the drop on demand type must have a low evaporation rate to avoid clogging of the nozzles, their application is limited to porous supports into which the ink penetrates and can dry by absorption, which is not the case with nonporous surfaces.

The continuous jet printing systems rarely use water-based inks, because this technology is more suitable for very high speed marking operations for which a high evaporation rate is needed. Thus, these inks are largely inks which are based on organic solvents, namely alcohols and ketones in particular. The inks used in deflected continuous jet systems have a good behaviour on all nonporous supports to be marked.

In conventional manner this type of ink contains a solvent or a solvent mixture, the majority solvent being highly volatile and only slightly viscous, namely alcohols, ketones and esters with a low molecular weight making it possible to adjust the viscosity to a value of 2 to 10 mpa.s.

More viscous and less volatile majority solvents such as glycol ethers can be added in order to improve the drying of the ink to the support and sometimes water can be added to said formulations, but always in small proportions. Use can be made of one or more binders, also known as resins, ensuring the adhesion of the ink to the supports in question and in particular to nonporous supports. The nature of these binders, specific to each category of support, also gives the ink most of its resistance to physical and/or chemical stresses. It is also possible to add one or more dyes and/or pigments to give the ink its colour, or particular optical properties such as fluorescence. It is optionally possible to add a "conductivity" salt in the case of continuous jet printing procedures.

Therefore the binder is the essential constituent of the ink making it possible to ensure its behaviour and its resistance on the particular substrate corresponding to the desired application. Thus, a specific binder corresponds to each application.

Thus, U.S. Pat. No. 4,465,800 describes an ink for an ink jet printer incorporating as the binder a film-forming resin of the resol-phenolic type, a solvent of the lower alcohol type and a modifying resin, e.g. an epoxy resin, able to react by crosslinking with the aforementioned resin. These inks have an excellent adhesion and an excellent resistance demonstrated by tests on various nonporous supports.

U.S. Pat. No. 4,168,254 relates to an ink having excellent adhesion, as well as ageing and abrasion resistance properties on various nonporous supports such as glass bottles, synthetic polymers, metal and incorporating as the essential constituent favouring adhesion a phenolic epoxy resin chosen in particular from among the polyglycidyl ethers of bisphenol A having a low molecular weight and low viscosity. The solvent is based on alcohols and ketones.

U.S. Pat. No. 5,270,368 relates to a UV hardenable ink composition for ink jet printing, particularly on printed circuits and which has excellent adhesion properties to various nonporous supports following exposure to UV light. This ink incorporates as the essential constituents:
- an epoxy-acrylate film-forming dimer or monomer responsible for the excellent adhesion properties to metal supports and the resistance to chemical stresses, the preferred compound being bisphenol A epoxy-diacrylate,
- an acrylate having a suspended carboxyl group enabling the hardened ink to be eliminated from the printed circuit by basic solutions,
- various acrylic resins having the effect of favouring the adhesion, increasing the resistance to chemical stresses, reducing the viscosity, increasing the hardening speed, improving the crosslinking and improving the abrasion resistance,
- a UV polymerization initiating agent.

EP-A-71 345 deals with an ink composition for ink jet printing which, after hardening and by exposure to UV, gives adhesive, resistant markings, particularly on glass bottles.

This ink necessarily incorporates a UV polymerization initiating agent and has as the binding agent at least one "prepolymer" epoxy resin with a low molecular weight (below 300), in particular chosen from among bisphenol A diglycidyl ethers, epoxidized novolaks permitting the improvement of the adhesion of the ink subject to the action of water, or soapy water, etc. Other acrylic or vinyl resins can also be incorporated to give a better adhesion to the support.

EP-A-466 345 relates to an ink composition for jet printing without an organic solvent and which has an aqueous dispersion of a vinyl, phenolic or epoxy resin and a dye. This composition may or may not be hardened and has excellent adhesion and resistance properties on nonporous substrates such as glass.

FR-A-2 317 344 relates to ink compositions for printing on glass having as the single binder a novolak resin.

GB-A-1 595 453 relates to ink compositions more particularly suitable for printing on polymeric substrates, especially polyolefins. The inks incorporate a binder, whose main constituents are a copolymer with carboxyl groups, e.g. a copolymer of acrylic or methacrylic acid with e.g. vinyl monomers such as styrene, or acrylates/methacrylates, an epoxy resin which is not specific, a crosslinking/hardening agent, which is an aminoalkylalkoxy-silane, a solvent and a pigment or dye.

Hardening takes place at ambient temperature and requires prolonged storage of the marked substrate in order to subsequently obtain a good adhesion and a good resistance, particularly to wet friction.

Moreover, due to the reactivity of the three constituents of the binder, the ink cannot be kept longer than a few hours and must in fact be stored in two separate containers, one of them containing the hardening ink, whilst the ink must be prepared by mixing immediately prior to its use.

The inks formulated according to the prior art and which consequently contain binders of the resol, epoxy-phenolic, vinyl or phenolic type have a behaviour and resistance which must be looked upon as inadequate on nonporous supports such as glass, metals and plastics when the markings are subject to the repeated action of water, detergents, bactericide, cleaning agents used in bottling chains. An excellent adhesion and resistance to chemical stresses can be obtained, in certain inks following hardening by UV, but this requires the incorporation into the composition of a UV polymerization initiating agent and the illumination of the ink after projection by a UV source.

In other inks, good adhesion and resistance characteristics result from the incorporation into the ink binder of a hardening/crosslinking agent, which must be kept separately and which is added to the other constituents immediately prior to printing.

Without wishing to be bound by a particular theory, the function of the binder is to bring about the adhesion to the surface, which is obtained by the interactions between on the one hand the polar functions giving the surfaces, particularly of glass or ceramic, highly hydrophilic characteristics and on the other hydrophilic polar functions of the ink binder. However, such a marking is then subject to the action of water and other cleaning or sterilizing agents such as sodium hypochlorite, at ambient or low temperature, the water tending to displace the ink under the effect of the creation of new, strong interactions with the surface and the ink is detached from the support. This phenomenon is exacerbated at low temperature, which is particularly the case when marked glass bottles are immersed in very cold water (temperature between 0° and 4° C.) or are placed in the refrigerator. It is also necessary for these excellent adhesion and chemical stress resistance properties to be obtained without any deterioration to the properties normally required of inks used for ink jet printers and in particular inks for printers using the continuous jet method, namely viscosity, resistivity, etc. The ink must also permit marking at a high speed and have the maximum possible drying rate.

The object of the present invention is therefore to permit the rapid marking, particularly by the ink jet method, of objects, whose surface is not porous and preferably the marking of glass, plastics or metal objects, whilst ensuring that said marking is of a permanent nature during subsequent treatments of the support by aqueous products, namely bactericides, sterilizing agents, detergents, etc., no matter whether at ambient or low temperature and without having to have recourse to UV hardening of the projected ink. According to the invention this object is achieved by an ink composition which is free from UV polymerization initiating agent and incorporating at least one organic solvent, a dye and/or a pigment and a binder, characterized in that the binder comprises the combination of at least one polymeric resin having hydroxyl or carboxyl functions and a hydrophobic polymeric resin of the epoxy type having a plasticizing effect.

Compared with the aforementioned, prior art inks and which in general only have a single binder, the incorporation into the ink binders according to the invention of a specific, hydrophobic polymeric resin of the epoxy type, having a plasticizing effect, permits a better adhesion of the ink to nonporous supports and an excellent resistance to chemical stresses. Therefore the ink compositions according to the invention can in particular be used in the marking of glass bottles, particularly in the manufacture of bottles, but also in bottling chains, in which it is necessary to mark the bottles prior to their filling. The polymeric resin with hydroxyl functions preferably has a hydroxyl number between 30 and 100 and can preferably be chosen from among vinyl resins having a hydroxyl function, e.g. certain copolymers of vinyl chloride and vinyl acetate such as Union Carbide Vinylite.

The polymer resin with carboxyl functions preferably has an acid number between 40 and 300 and is preferably chosen from among acrylic resins with acid functions, e.g. polymers and copolymers of acrylic monomers with one another or with other ethylenically unsaturated monomers such as styrene.

The hydrophobic polymeric resin of the epoxy resin type having a plasticizing action preferably has an epoxy proportion between 1000 and 6000 mmole/kg and it is preferably chosen from among resins of a liquid type and preferably having a low viscosity, e.g. close to 1 Pa.s. Resin b) is e.g. chosen from among resins of the modified or unmodified bisphenol epoxy type. It has been found that the combination of a polymeric resin having carboxyl functions and a specific, hydrophobic polymeric resin of the epoxy type having a plasticizing action surprisingly makes it possible to obtain markings on a nonporous support such as glass bottles, which has an excellent adhesion and excellent resistance when subject to the action of water or other aqueous agents, not only at ambient temperature, but also at low temperatures (below 10° C.). This is in particular the case when the glass bottles are immersed in cold water (e.g. between 0° and 4° C.) or are placed in a refrigerator and subject to condensation. Such an ink incorporating as the binder the combination of a resin (e.g. acrylic) having acid functions and the hydrophobic, epoxy resin having a plasticizing effect also has the supplementary advantage of being soluble in alkalis, which are used for cleaning recycled glass bottles. The weight ratio of the resin having carboxyl or hydroxyl functions to the epoxy resin is preferably between 20:80 and 80:20. The resins are present in an adequate quantity to obtain a suitable viscosity of the complete formulation and preferably between 2 and 10 mpa.s.

The solvents which can be used are those for which the solubility of the dyes and resins is adequate e.g. alcohols, esters, ketones, aromatic hydrocarbons, preferably lower alcohols, light esters, volatile ketones, considered singly or in mixture, which satisfy the high printing speed requirements. Thus, the solvent will preferably be chosen from among the following compounds, considered singly or in mixture: aliphatic alcohols with 1 to 10 carbon atoms, ketones with 3 to 10 carbon atoms, aromatic hydrocarbons, aliphatic esters ($C_1$ to $C_5$) of $C_2$–$C_5$ carboxylic acids, e.g.

methanol, ethanol, propanol, isopropanol, n-butanol, acetone, dimethyl ketone, methyl ethyl ketone, methyl propyl ketone, methyl isobutyl ketone, ethyl propyl ketone, cyclopentanone, cyclohexanone, alkyl acetates, benzene, toluene, xylene and all other volatile solvents at ambient temperature and to which are optionally added one or more less volatile solvents making it possible to delay drying and therefore permitting the good formation of the ink film, e.g. ethylene glycol ethers, mono, di and tri-propylene glycol and esters thereof. A preferred solvent is methyl ethyl ketone.

Resins in addition to those mentioned below can be incorporated into the ink compositions according to the invention in order to improve certain properties thereof, namely ketone or aldehyde resins, derivatives of colophony and colophony considered singly or in mixture.

The products giving the ink the conductivity necessary for projection by deflected continuous jet are ionizable compounds such as single or quaternary ammonium, alkaline earth metal or alkali metal salts, in the form of halides, perchlorates, nitrates, thiocyanates, acetates, sulphates, propionates, etc.

The conductivity salt is present in an adequate quantity to give the complete formulation a conductivity, which preferably exceeds 200 µs/cm.

The dyes used are of the solvent dye type, the basic dye type (according to the categories of the Colour Index Guide) or pigments, to the extent that they can be obtained in a sufficiently stable and finely dispersed form. The composition preferably contains 0.5 to 10 wt. % dye and/or pigment.

The ink can also incorporate an additive chosen from among an antifoaming agent, a chemical stabilizer or a UV stabilizer considered singly or in combination.

The invention also relates to a process for marking objects, particularly nonporous objects, by the projection onto said objects of an ink composition, like that described hereinbefore. Marking can in particular take place by the continuous jet method.

The invention also relates to a substrate, particularly a nonporous support or substrate having a marking incorporating the ink composition described hereinbefore. This nonporous substrate can be of metal, e.g. aluminium, steel (drink cans), glass (glass bottles), wood, ceramic, glazed paper, synthetic polymer (plastics) such as PVC, PET or polyethylene, Plexiglass, or any other nonporous substances.

The invention will be more readily understood from reading the following description of non-limitative examples.

EXAMPLES

The following ink compositions were prepared by mixing the products given in the following table 1. Except when indicated to the contrary, all percentages are by weight.

TABLE 1

|  | Ex. 1 | Ex. 2 |
| --- | --- | --- |
| "Solvent Black 29" dye | 6 | 5 |
| Vinyl resin with hydroxyl functions (hydroxyl number 65) | 4 | 0 |
| Acrylic resin with acid functions (acid number 250) | 0 | 15 |
| Liquid epoxy resin (5000 mmole/kg) | 9 | 15 |
| Ketone resin | 13 | 0 |
| Conductivity salt: ammonium thiocyanate | 2 | 1 |
| Solvent: methyl ethyl ketone | 66 | 64 |
| Viscosity (mPa.s) | 4.8 | 4.5 |

TABLE 1-continued

|  | Ex. 1 | Ex. 2 |
| --- | --- | --- |
| Conductivity (mS/cm) | 0.8 | 0.9 |

The two thus prepared ink compositions were tested in continuous jet printers and give printed impressions of excellent quality.

EXAMPLE 1

The jet marking of glass bottles with this formulation has a particularly high resistance to wet abrasion evaluated by rubbing the surface with the finger, following immersion in water or in detergent solutions with a basic pH of approximately 10. Under the same conditions inks formulated according to different principles and recommended for their good behaviour on glass, namely on the one hand an ink supplied by IMAJE, designated 5119 and on the other an ink from VIDEOJET, designated 16-8600Q do not have a resistant behaviour.

EXAMPLE 2

The jet marking of glass bottles with said formulation is particularly resistant to wet abrasion evaluated by rubbing the surface with the finger, after immersion in very cold water (0° to 4° C.) or after placing in the refrigerator. This ink is also soluble in alkalis, as diluted as soda or potash between 0.5 and 3% in the water used for the cleaning of recycled glass bottles. Under the same conditions, inks formulated according to different principles and recommended for their behaviour on soluble alkali and glass, namely on the one hand an ink based on acrylic resin without plasticizing by an epoxy resin, and on the other an ink supplied by VIDEOJET, reference 16-8200 have an inadequate resistance.

We claim:

1. Ink composition, liquid at room temperature, for ink jet printing, for the marking of objects, free from UV polymerization initiating agent and comprising at least one dye and/or a pigment, an organic solvent and a binder, characterized in that the binder comprises the combination of at least a:

a) polymeric resin having a hydroxyl or carboxyl functions b) hydrophobic polymeric epoxy resin having a plasticizing effect, and another resin different from resins a) and b).

2. Ink composition, liquid at room temperature, for ink jet printing, for the marking of objects free from UV polymerization initiating agent and comprising at least one dye and/or a pigment an organic solvent and a binder characterized in that the binder comprises the combination of at least a:

a) Polymeric resin having a hydroxyl or carboxyl functions b) hydrophobic polymeric epoxy resin having a plasticizing effect, and a conductive salt.

3. Ink composition according to claim 1, characterized in that it comprises an additive chosen from the group consisting of an antifoaming agent, a chemical stabilizer and a UV stabilizer, considered singly or in combination.

4. Ink composition according to claim 1, characterized in that the dye is chosen from the group consisting a solvent dyes, pigments and basic dyes.

5. Ink composition according to claim 1, characterized in that the organic solvent is chosen from the group consisting of alcohols, ketones, esters and aromatic hydrocarbons, considered singly or in combination and to which have optionally been added one or more less volatile solvents.

6. Ink composition according to claim 1, characterized in that the polymeric a) is a resin having hydroxyl functions with a hydroxyl number from 30 to 100.

7. Ink composition according to claim 1, characterized in that the polymeric resin a) is a resin having carboxyl functions with an acid number between 40 and 300.

8. Ink composition according to claim 1, characterized in that the resin b) has proportion between 1000 and 6000 mmole/kg.

9. Ink composition according to claim 1, characterized in that the additional resin comprises at least one member of the group consisting of ketone resins, aldehyde resins, and colophony resins.

10. Ink composition according to claim 2, characterized in that the conductive salt is chosen from the group consisting of halides, perchlorates, nitrates, thiocyanates, acetates, propionates and sulphates of single or quaternary ammonium, alkaline earth metals and alkali metals.

11. Ink composition according to claim 5, characterized in that the solvent is methyl ethyl ketone.

12. Ink composition, liquid at room temperature, for ink jet printing, for the marking of objects, free from UV polymerization initiating agent and comprising at least one dye and/or a pigment, an organic solvent and a binder, characterized that the binder comprises the combination of at least a:

a) polymeric resin having a hydroxyl or carboxyl functions and b) hydrophobic polymeric epoxy resin having a plasticizing effect, and resin a) is a vinyl resin selected from the group consisting of copolymers of vinyl chloride and vinyl acetate.

13. Ink composition according to claim 7, characterized in that the resin a) is an acrylic resin.

14. Ink composition according to claim 13, characterized in that the resin a) is chosen from the group consisting of acrylic polymers and copolymers with one another or with other ethylenically unsaturated monomers.

15. Ink composition according to claim 8, characterized in that the resin b) is a liquid resin.

16. Ink composition according to claim 8, characterized in that the resin b) is chosen from the group consisting of modified and unmodified bisphenol epoxy resins.

17. Composition according to claim 1, characterized in that the weight ratio of the resin having hydroxyl or carboxyl functions to the epoxy resin is between 20:80 and 80:20.

18. Composition according to claim 1, characterized in that it comprises 0.5 to 10 wt. % dye and/or pigment.

* * * * *